(12) United States Patent
Onimaru et al.

(10) Patent No.: US 11,238,517 B2
(45) Date of Patent: Feb. 1, 2022

(54) NAVIGATION SERVER, NAVIGATION CLIENT AND NAVIGATION SYSTEM

(71) Applicants: HONDA MOTOR CO., LTD., Tokyo (JP); THE UNIVERSITY OF TOKYO, Tokyo (JP)

(72) Inventors: Hiroyuki Onimaru, Tokyo (JP); Tomohiro Tanikawa, Tokyo (JP); Michitaka Hirose, Tokyo (JP); Takuji Narumi, Tokyo (JP); Toshiki Takeuchi, Tokyo (JP); Masato Nomiyama, Tokyo (JP)

(73) Assignees: HONDA MOTOR CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 923 days.

(21) Appl. No.: 15/469,761

(22) Filed: Mar. 27, 2017

(65) Prior Publication Data

US 2017/0287046 A1 Oct. 5, 2017

(30) Foreign Application Priority Data

Mar. 31, 2016 (JP) .............................. JP2016-072619

(51) Int. Cl.
*G06Q 30/00* (2012.01)
*G06Q 30/06* (2012.01)
(Continued)

(52) U.S. Cl.
CPC ......... *G06Q 30/0631* (2013.01); *H04L 67/04* (2013.01); *H04L 67/10* (2013.01); *H04L 67/18* (2013.01); *H04L 67/42* (2013.01)

(58) Field of Classification Search
CPC ..... G06Q 30/0631; H04L 67/04; H04L 67/10; H04L 67/18; H04L 67/42
(Continued)

(56) References Cited

U.S. PATENT DOCUMENTS

2014/0142842 A1* 5/2014 Knobel ............. G01C 21/3476
701/410

FOREIGN PATENT DOCUMENTS

JP 2007-093583 A 4/2007
JP 2008-128659 A 6/2008

OTHER PUBLICATIONS

Z. Wang and F. Yang, "A Multiple-Mode Mobile Location-Based Information Retieve System," 2009 Fifth International Conference on Wireless and Mobile Communications, 2009, pp. 410-415, doi: 10.1109/ICWMC.2009.75. (Year: 2009).*

(Continued)

*Primary Examiner* — Anand Loharikar
(74) *Attorney, Agent, or Firm* — Squire Patton Boggs (US) LLP

(57) ABSTRACT

Provided is a navigation server or the like capable of improving a convenience for trip planning by a user of a navigation client. The user can designate, on the navi-client 2, a plurality of topics from among the plurality of topics $TPX_0(k)$ in the designated area ROI, as the primary designated topics $TPX_1(i)$ and further as the secondary designated topics $TPX_2(j)$. Then, on the navi-client 2, the guide information can be output for guiding the plurality of POI(j) corresponding to the plurality of secondary designated topics $TPX_2(j)$ in the order which is basically defined in accordance with the correlation rule among the designated topics $TPX_2(j)$.

8 Claims, 7 Drawing Sheets

(51) Int. Cl.
*H04L 29/08* (2006.01)
*H04L 29/06* (2006.01)

(58) Field of Classification Search
USPC ............................................. 705/26.1–27.2
See application file for complete search history.

(56) References Cited

OTHER PUBLICATIONS

Office Action dated Oct. 8, 2019 issued in corresponding Japanese Patent Application No. 2016-072619.

* cited by examiner

NAVIGATION SERVER, NAVIGATION CLIENT AND NAVIGATION SYSTEM

BACKGROUND OF THE INVENTION

Field of the Invention

The present invention relates to a navigation server, a navigation client, and a navigation system.

Description of the Related Art

There has been proposed a technology which searches a map database for location data meeting a keyword concerning a place input by a user from a microphone and displays the location data in the descending order of frequencies of places being set as a destination by the user (see Japanese Patent Laid-Open No. 2007-093583). This eliminates the necessity for the user to operate to hierarchically select a desired place by a region or facility name, which improves an ease of use of a navigation apparatus.

However, there is little or no historical data of destination settling record by the user himself/herself about an area to be visited for the first time or an area with a low visiting frequency, which lacks convenience of setting of a place to be visited.

Therefore, the present invention has an object to provide a navigation server or the like capable of improving a convenience for trip planning by a user of a navigation client.

SUMMARY OF THE INVENTION

A navigation server according to the present invention includes a navigation server storage device which stores a set of topics for each of a plurality of areas and a correlation rule defining an order of the topics contained in the set, a first server arithmetic processing element which recognizes a designated area in a navigation client based on a communication with the navigation client as a mobile station, and then, retrieves a plurality of topics in the designated area and a correlation rule among the plurality of topics from the navigation server storage device, and a second server arithmetic processing element which assists, by transmitting the plurality of topics and the correlation rule retrieved by the first server arithmetic processing element to the navigation client, the navigation client in designating a topic group that is at least a part of the plurality of topics and in outputting guide information for guiding a plurality of places corresponding to at least a part of the topic group in an order defined in accordance with the correlation rule.

A navigation client according to the present invention includes an input device, an output device, and a client storage device storing client map information, and further includes a first client arithmetic processing element which makes a navigation server recognize a designated area input through the input device based on a communication with the navigation server, and a second client arithmetic processing element which receives a plurality of topics in the designated area and a correlation rule among the plurality of topics from the navigation server, and then, outputs the plurality of topics to the output device, wherein the first client arithmetic processing element recognizes a topic group that is at least a part of the plurality of topics designated through the input device, and guide information is output to the output device, the guide information being for guiding a plurality of places corresponding to at least a part of the topic group in an order defined in accordance with the correlation rule.

According to the navigation server, navigation client, and navigation system including the navigation server, navigation client of the present invention, the user can designate, on the navigation client, a plurality of topics as "designated topics", from among a plurality of topics in the designated area. Then, on the navigation client, the guide information can be output for guiding the plurality of places corresponding to the plurality of designated topics in the order which is defined in accordance with the correlation rule among the designated topics.

This allows, even if a designated area is less familiar or unfamiliar to the user, the user to select a plurality of topics of interest from among the topics in this designated area to guide a plurality of places corresponding to the topics in the order in accordance with the correlation rule.

DETAILED DESCRIPTION OF THE PREFERRED EMBODIMENTS

Configuration of Navi-System

Figure 1:
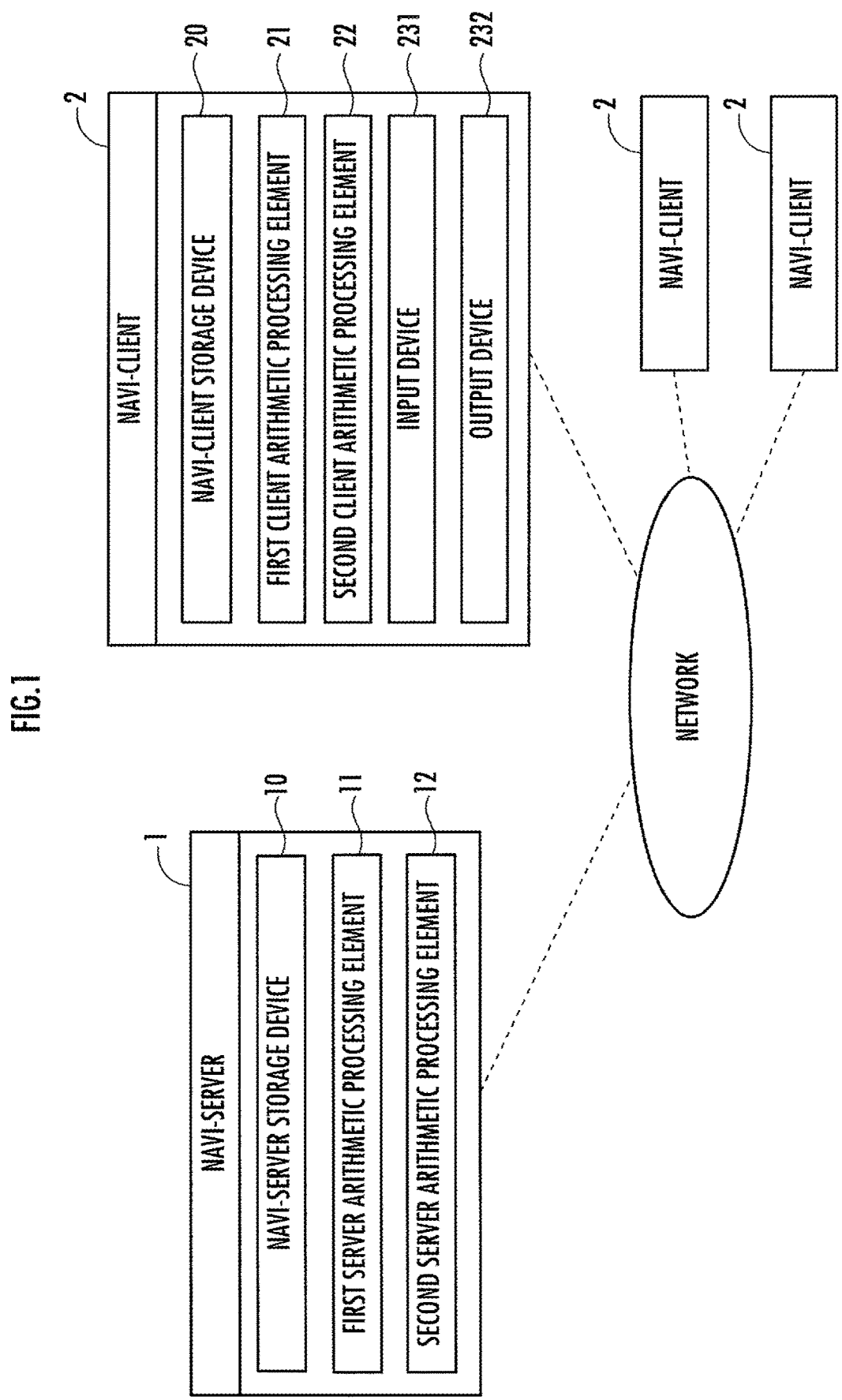
FIG. 1 is a configuration diagram of a navigation system as an embodiment of the present invention.

A navi-system shown in FIG. 1 as an embodiment of the present invention includes a navi-server 1 and a plurality of navi-clients 2 as mobile stations ("navi" is abbreviation for navigation, and the same shall apply hereinafter). The navi-server 1 and each of the plurality of navi-clients 2 are communicable with each other via one or more networks. Each navi-client 2 includes an information terminal carried by a user, and also includes, an information terminal temporarily or permanently mounted on a moving vehicle that is a device having a function to move in accordance with a driving operation by the user such as a vehicle including a four-wheeled vehicle, two-wheeled vehicle, a bicycle, or eh like.

Configuration of Navi-Server

The navi-server 1 includes a computer as a fixed station, and includes a navi-server storage device 10, a first server arithmetic processing element 11, and a second server arithmetic processing element 12. The navi-server 1 may be configured by a portable terminal device such as a smart phone or tablet as a mobile station.

The navi-server storage device 10 stores and holds a plurality of topics for each of a plurality of areas and a correlation rule defining an order of the topics. The navi-server storage device 10 stores and holds, besides the above, road environment information and navi-server map information. The "road environment information" includes a movement cost $S(k)$ for each link $L(k)$. The "navi-server map information" includes a column of coordinate values ((latitude, longitude) or (latitude, longitude, altitude)) of a position, shape, attitude and the like of each of the links constituting a road, and in addition, link identification information for identifying each link and data representing an attribute. The links are connected through a node.

The first server arithmetic processing element 11 and the second server arithmetic processing element 12 include an arithmetic processing device (CPU), and, as needed, communication equipment, a storage device (memory) and the like, the arithmetic processing device reading software and data as appropriate from a specified region on a memory constituting the navi-server storage device 10 to perform on the data a specified arithmetic process in accordance with the software. The specified arithmetic process is described later in detail.

Configuration of Navi-Client

The navi-client 2 includes a portable terminal device such as a smart phone or tablet as a mobile station. The term "portable" refers to a terminal, for example, having a size of a normal palm of a human hand and having a weight capable of being carried by one hand or in a state of being put in a pocket of clothes or the like. The navi-client 2 may include equipment larger and heavier than portable equipment (e.g., equipment built in a moving vehicle).

The navi-client 2 includes a navi-client storage device 20, a first client arithmetic processing element 21, a second client arithmetic processing element 22, an input device 231, and an output device 232.

The navi-client storage device 20 is configured to store and hold received information and an arithmetic processing result such as a calculation result which are obtained by each of the first client arithmetic processing element 21 and the second client arithmetic processing element 22. The navi-client storage device 20 is configured to store and hold navi-client map information. The "navi-client map information" includes a coordinate column representing a position, shape, attitude and the like of each of the links constituting a road, and link identification information for identifying each link.

The navi-client map information may not include the coordinate column, but may include image information for displaying the map on the output device 232 and link identification information of each of the links constituting a road included in the map. In this case, of the coordinate values included in the navi-server map information, a coordinate value matching a coordinate value included in probe information or request information may be specified by the navi-server 1 such that the link identification information, road type or the like corresponding to the specified coordinate value may be specified.

Even if a difference in a specification or data structure between the navi-client map information and the navi-server map information causes a difference in definitions or the like of the coordinate columns between the respective map information, link matching is enabled by attaching common link identification information to the same link. The navi-server 1 transmits navi-server route information including the link identification information, and the navi-client 2 displays through the output device 232 an image of a navigation route containing a plurality of links which are identified by the link identification information included in the route information.

The first client arithmetic processing element 21 and the second client arithmetic processing element 22 include an arithmetic processing device (CPU), and, as needed, communication equipment, a storage device (memory) and the like, the arithmetic processing device reading software and data as appropriate from a specified region on a memory constituting the navi-client storage device 20 to perform on the data a specified arithmetic process in accordance with the software. The specified arithmetic process is described later in detail.

The input device 231 includes an operation button or a microphone, and enables various operations or input setting through an operation or speech by the user. The output device 232 includes a display device and an acoustic output device (speaker), and displays image contents of the navi-client map information or the like or outputs acoustic contents. The input device 231 and the output device 232 may be configured of a touch panel type display.

The phrase that the element of the present invention "outputs" the information means to output information in any form recognizable by a human through his/her five senses such as eyesight, hearing, and touch, for example, displaying the information, audio outputting, and vibrational outputting. The phrase that the element of the present invention "is configured" to perform a corresponding arithmetic process refers to that the element has a function or is programmed to read a required program and data from a memory to perform the corresponding arithmetic process on the basis of the data in accordance with the program.

Function

Database Construction

Figure 2:
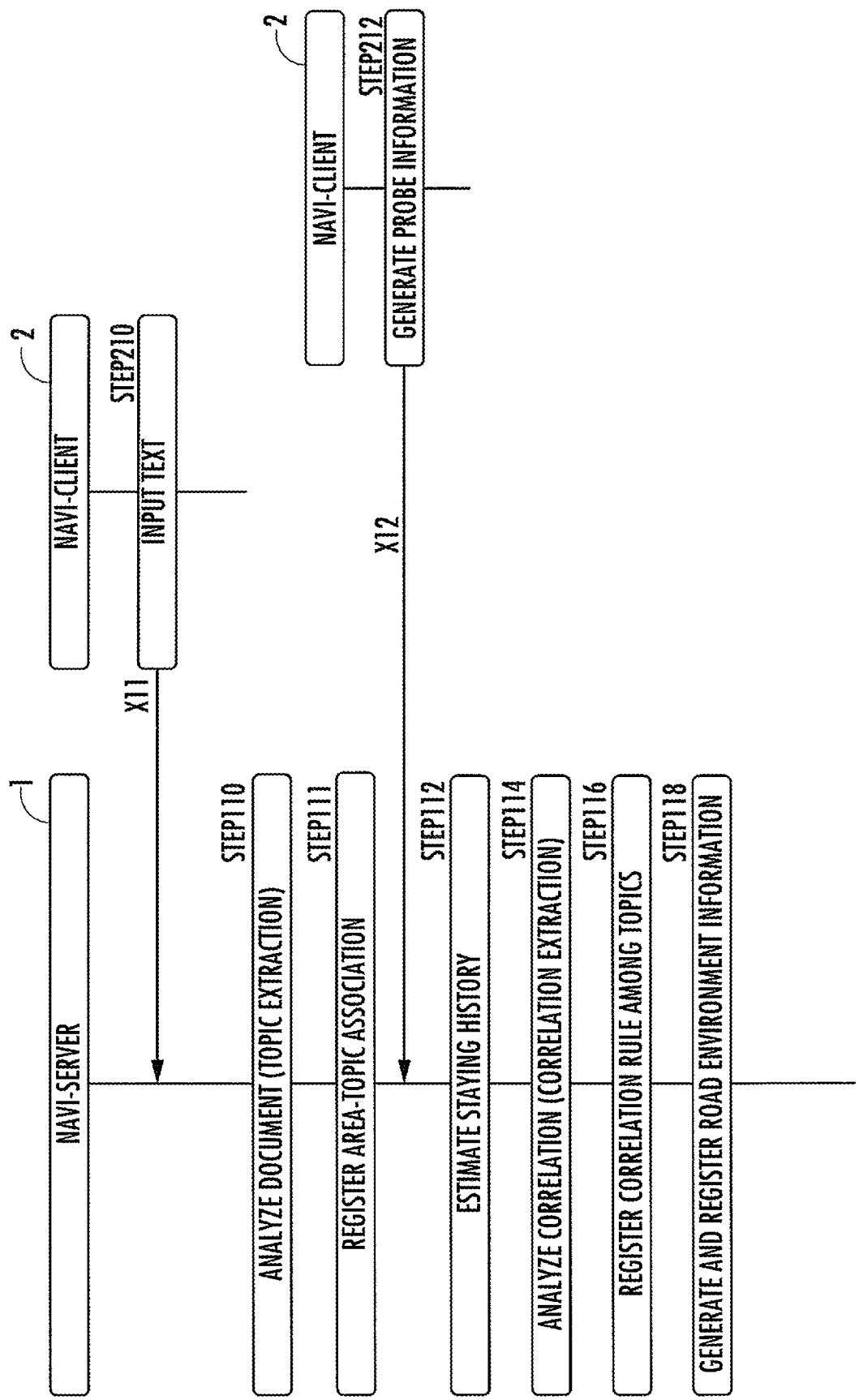
FIG. 2 is an explanatory diagram regarding a database construction function in cooperation between a navigation server and a navigation client.

In the navi-client 2, the user inputs a text (sentence) through the input device 231 (STEP210 in FIG. 2). The first client arithmetic processing element 21 transmits text data corresponding to this text to the navi-server 1 (arrow X11 in FIG. 2). In the navi-server 1, text data sent from a source to send information (information station) different from the navi-client 2 may be collected. The text data may be generated by sending from the navi-client 2 data of an image (still image or moving image) captured by a camera (not shown) mounted on or connected with the navi-client 2, analyzing the image data by the navi-server 1, and making reference to the database about an analyzing result of the image.

In the navi-server 1, the first server arithmetic processing element 11 extracts a topic high in a frequency of appearance for each area on the basis of the text data in accordance with a text data analysis method such as feature extraction based on TF-IDF (STEP110 in FIG. 2). For example, from the text data such as "AAA in BBB food shop is tasty", "the CCC exhibition in the DDD museum is worth watching!", and "a night view from the EEE observatory is beautiful", words such as "AAA", "BBB mart", "CCC exhibition", "DDD museum", "EEE observatory", and "night view" are extracted as the topics.

Then, the topic is associated with a corresponding area and registered or stored in the navi-server storage device 10 (STEP111 in FIG. 2). The data sent from the navi-client 2 includes positional information measured in the navi-client 2, and the topic extracted from the data is associated with a specific area on the basis of the positional information. Data sent from an information source (such as a local broadcast station) unique to an area also includes positional information, and a topic extracted from the data is associated with a specific area on the basis of the positional information. The words or topic directly designating a place such as the "DD museum" may be associated with an area on the basis of positional information of the place included in the navi-server map information.

In the navi-client 2, the first client arithmetic processing element 21 measures or detects a current position of the navi-client 2 in a time series manner. The current position of the navi-client 2 is measured on the basis of signals received from an artificial satellite by a GPS receiver, and besides, output signals from a gyro sensor as needed. The first client arithmetic processing element 21 generates the "probe information" representing the time series of the position of the navi-client 2 (STEP212 in FIG. 2), and transmits it to the navi-server 1 (arrow X12 in FIG. 2). The probe information may include, in place of or in addition to the time series of the position, any information about factors affecting running of vehicle measured or detected in the navi-client 2 such as weather information (climate, temperature, humidity, presence or absence of road surface freezing).

In the navi-server 1, the first server arithmetic processing element 11 estimates a staying history of the user of the navi-client 2 on the basis of the probe information transmitted from an unspecified number of navi-clients 2 (STEP112 in FIG. 2). Whether or not the user stays at a place or POI (Point of Interest) is determined depending on, for example, whether or not a continuous time series of the position of the navi-client 2 over a certain time period is contained in a range near a location of the place. If the navi-client 2 is mounted on a vehicle, it may be determined that the user has stayed at a place near a point where a time period from when an IGN switch of the vehicle is turned OFF from ON until when it is turned ON again continues over a certain time period. An ON/OFF state of the IGN switch is detected by the first client arithmetic processing element 21 and may be transmitted as a part of information of the probe information or another information to the navi-server 1. A standard staying time period of the user is calculated for each place or for each category of the place, and a result of the calculation is registered in the navi-server storage device 10.

By the staying history, a transition of the categories of the places the user stopped over in an order of "X"→"Y"→"Z"→ . . . is specified. For this reason, as for the categories of the places the user stops over, a correlation rule such as {A}→{B} (after visiting a place of a category A, moving to a place of a category B) is extracted on the basis of the staying history in accordance with a correlation analysis such as an associations analysis method, and an evaluation index value such as a certainty factor or a support degree for each correlation rule is calculated (STEP114 in FIG. 2).

The navi-client 2 or its user is classified according to its preference into any of a plurality of clusters, and the correlation rule and the evaluation index value are defined for each of the clusters and registered in the navi-server storage device 10 (STEP116 in FIG. 2). Clustering of the navi-client 2 or its user is performed by, for example, on the basis of an identifier of the navi-client 2 or its user included in the probe information (see arrow X12 in FIG. 2), or by the staying history or information concerning the preference thereof registered in the navi-server storage device 10.

In the navi-server 1, the first server arithmetic processing element 11 generates the road environment information on the basis of the probe information transmitted from an unspecified number of navi-clients 2, and registers it in the navi-server storage device 10 (STEP118 in FIG. 2). The road environment information may include road environment information obtained by the navi-server 1 from an external information source via a network. The road environment information may include, similarly to the probe information as its base, any information about factors affecting running of vehicle such as weather information (climate, temperature, humidity, presence or absence of road surface freezing).

Trip Planning Assistance for User

In the navi-client 2, an application for action planning is invoked through the input device 231, and an initial screen is displayed on the output device 232. For example, as shown in FIG. 4A, the initial screen includes a map on the basis of the navi-client map information. The first client arithmetic processing element 21 recognizes an area or ROI (Region of Interest) designated by the user through the input device 231 (STEP221 in FIG. 3).

For example, a point corresponding to a portion tapped on a map which is displayed on the output device 232 is set as a center of the area, and a scale of the map is changed by pinching such that a size of the area or a length of a distance from the center is changed, and thereby, the position and size of the area is arbitrarily designated. Additionally, the area may be designated by the user voice-inputting a name of the area through the input device 231.

Figure 3:
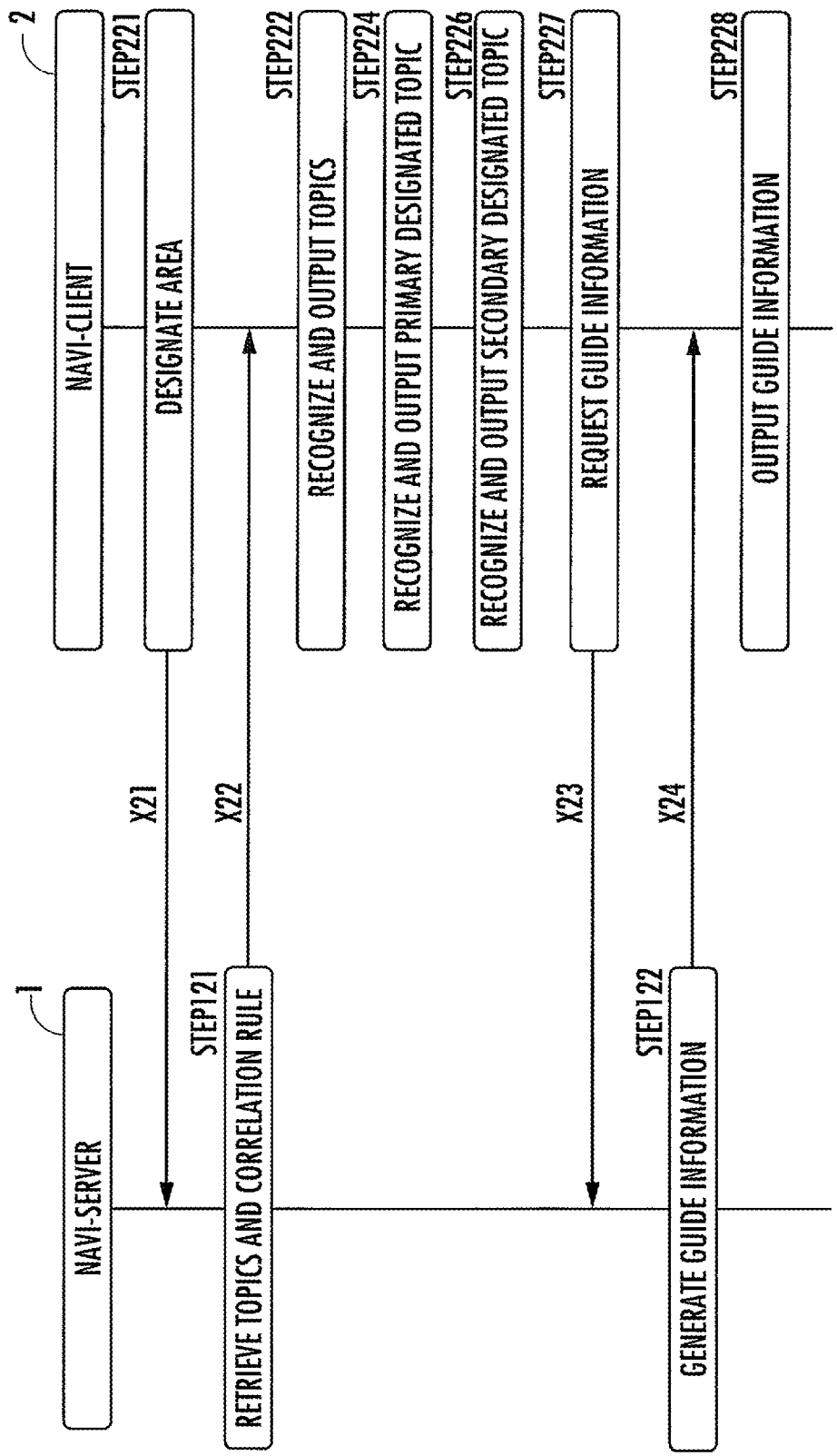
FIG. 3 is an explanatory diagram regarding a location guide function in cooperation between the navigation server and the navigation client.
Figure 4A:
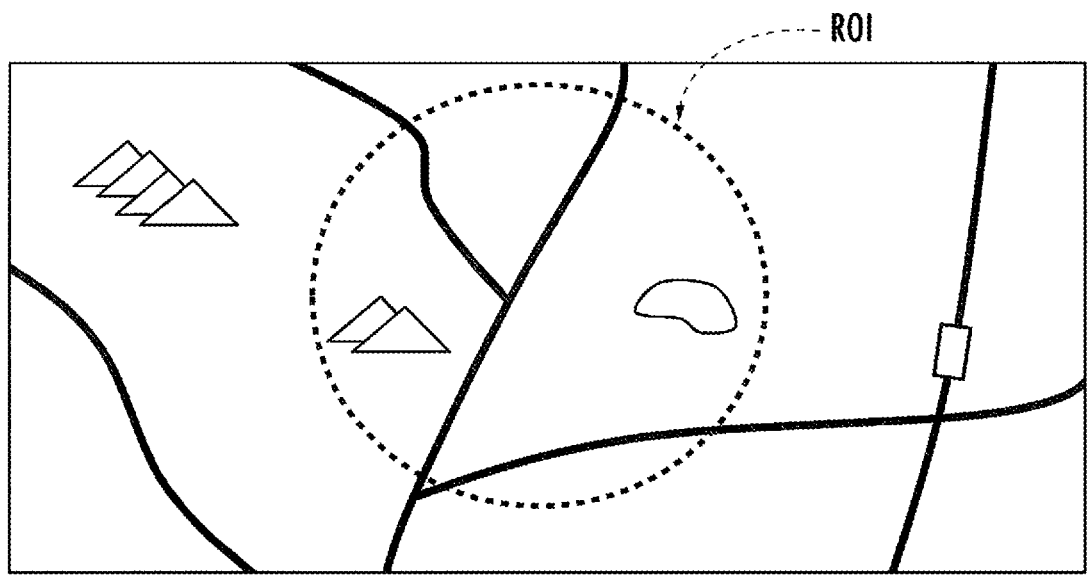
FIG. 4A is an explanatory diagram regarding area designation in the navigation client.

In response to this, the first client arithmetic processing element 21 recognizes the designated area ROI, and then, information for specifying this area is transmitted to the navi-server 1 (arrow X21 in FIG. 3). In association with this, the identifier of the navi-client 2 or its user is transmitted to the navi-server 1 to determine the cluster into which the navi-client 2 or its user is classified.

In the navi-server 1, the first server arithmetic processing element 11 recognizes the designated area ROI, and then, retrieves a plurality of topics and correlation rule among the topics which are associated with the designated area ROI and registered in the navi-server storage device 10 or the database (STEP121 in FIG. 3). The second server arithmetic processing element 12 transmits a result of the retrieval to the navi-client 2 (arrow X22 in FIG. 3). Note that at the same time as this or any later time, the first server arithmetic processing element 11 may retrieve the road environment information in the designated area ROI. The road environment information includes a movement cost of each of a plurality of links included in the designated area ROI.

Figure 4B:
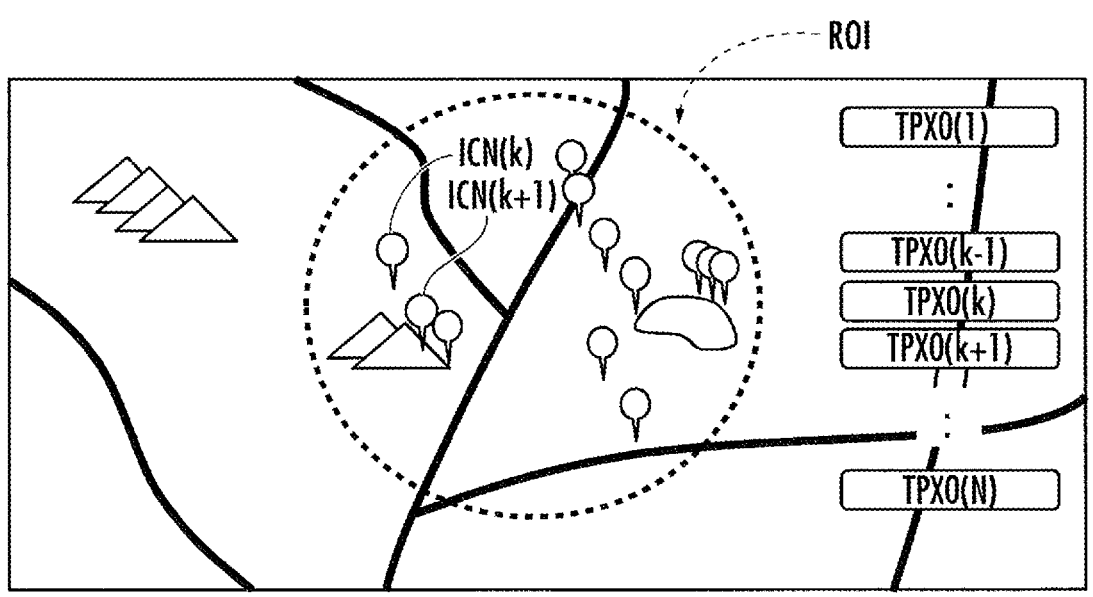
FIG. 4B is an explanatory diagram regarding a topic corresponding to a designated area output in the navigation client.

In the navi-client 2, the second client arithmetic processing element 22 receives or recognizes the result of the retrieval, and then, the topics $TPX_0(1)$ to $TPX_0(N)$ are output on the output device 232 (STEP222 in FIG. 3). By doing so, as shown in FIG. 4B, for example, displayed are a plurality of buttons on which the topics $TPX_0(1)$ to $TPX_0(N)$ are put. The topic $TPX_0(k)$ ($1 \leq k \leq N$) is a language element such as "AAA spa", "BBB udon", "CCC observatory", "DDD park", "EEE mart", or "FFF art museum".

Displayed on the map are icons ICN(1), . . . ICN(k), . . . ICN(N) representing places corresponding to the respective topics.

The first client arithmetic processing element 21 recognizes a topic designated by the user operating the input device 231 from among the topics $TPX_0(1)$ to $TPX_0(N)$ as a primary designated topic, and the topic is output on the output device 232 (STEP224 in FIG. 3).

Figure 5A:
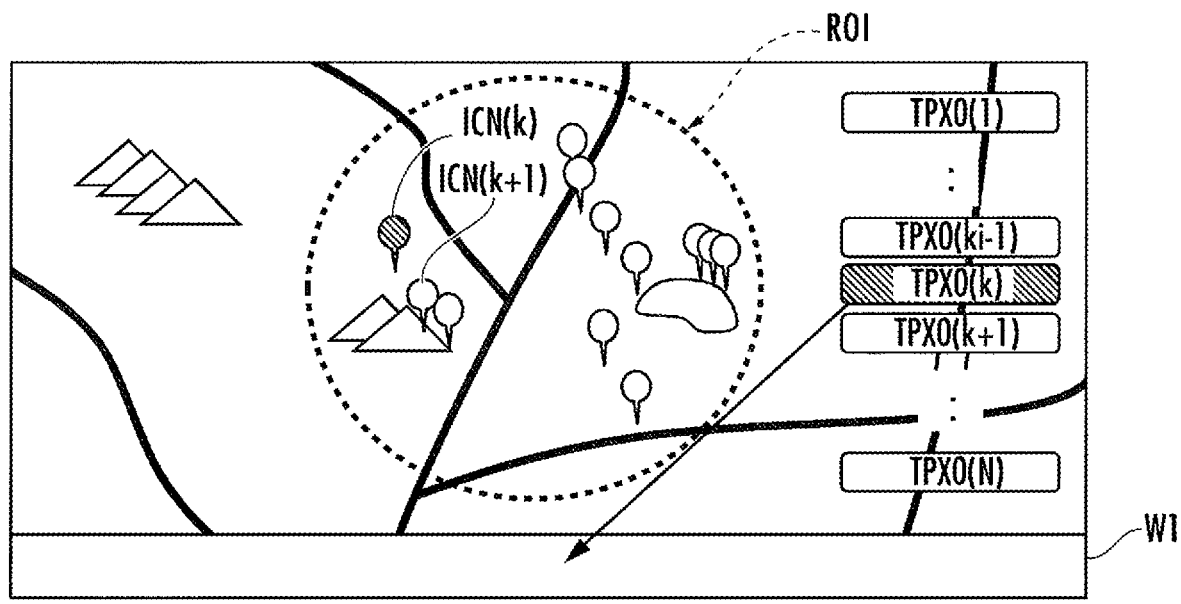
FIG. 5A is an explanatory diagram regarding topic designation in the navigation client.

For example, as shown in FIG. 5A, of the plurality of buttons corresponding to the topics $TPX_0(1)$ to $TPX_0(N)$ displayed on the right side of the screen, any button is operated or swiped so as to be moved into a first window $W_1$ on a lower side of the screen to designate the topic corresponding to the button. In addition, the texts ($TPX_0(1)$ to $TPX_0(N)$) put on the respective buttons may be voice-input to the microphone constituting the input device 231 to designate the topic. An inverse operation (e.g., swiping from the first window $W_1$ into the right side on the screen, or a voice input of the corresponding text and of designation cancel) may cancel the designation of the topic as the primary designated topic.

Figure 5B:
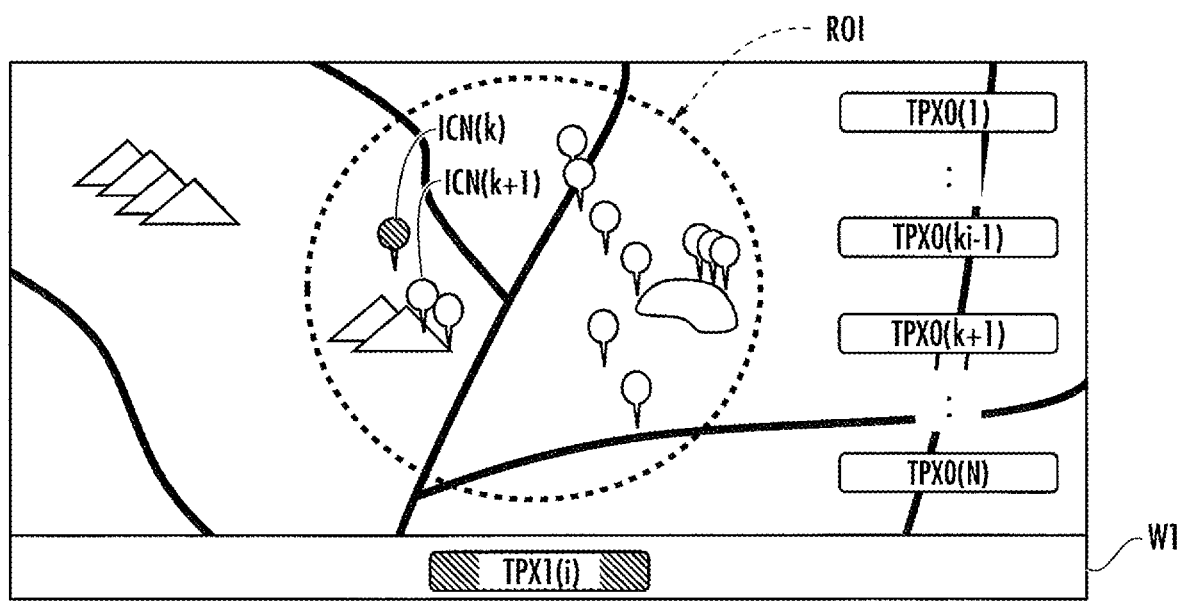
FIG. 5B is an explanatory diagram regarding topic designation in the navigation client.

The icon ICN(k) corresponding to the topic $TPX_0(k)$ which is designated (swiped) or being designated (tapped) as the primary designated topic $TPX_1(i)$ may be highlighted so as to be distinguished from other icons ICN(z) (z≠k) (see FIG. 5A and FIG. 5B). This allows the user to grasp a relationship between the topic and the places relating to this topic, which makes it possible to determine whether or not the topic designation is appropriate in consideration of a required travel distance grasped by the map.

As shown in FIG. 5B, from the right side of the screen, the button representing the topic $TPX_0(k)$ disappears, and the button representing the primary designated topic $TPX_1(i)$ (=$TPX_0(k)$) is displayed in the first window $W_1$.

In the embodiment, the buttons representing the plurality of primary designated topics $TPX_1(1)$ to $TPX_1(N_1)$ ($N_1$: a positive even integer) are displayed in the first window $W_1$ on the output device 232 in a form of a plurality of sets each having elements of a pair of primary designated topics $TPX_1(i)$ and $TPX_1(i+1)$ (i: a positive odd integer). The buttons respectively representing the primary designated topics $TPX_1(i)$ and $TPX_1(i+1)$ which constitute the set are arrayed (from left to right in the embodiment) in an order defined in accordance with a correlation rule $\{TPX_1(i)\} \rightarrow \{TPX_1(i+1)\}$ for which an evaluation index value is equal to or more than a reference value. The number of the primary designated topics constituting the set may be more than "2".

The second client arithmetic processing element 22 recognizes, of the primary designated topics $TPX_1(i)$, the plurality of sets designated by the user through the input device 231 as a secondary designated topic $TPX_2(j)$, and the recognized topic is output on the output device 232 (STEP226 in FIG. 3).

Figure 6A:
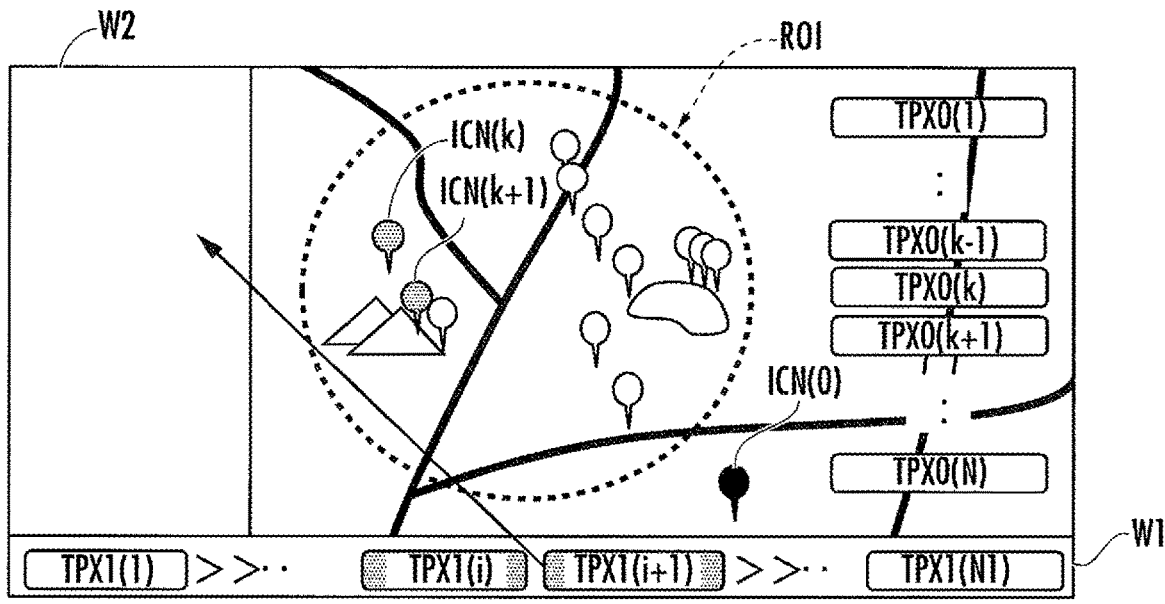
FIG. 6A is an explanatory diagram regarding designation of a designated topics set in the navigation client.

For example, as shown in FIG. 6A, by operating or swiping the buttons representing one set (a pair of primary designated topics $TPX_1(i)$ and $TPX_1(i+1)$) to together move them from the first window $W_1$ into a second window $W_2$ on the left side of the screen, a set corresponding to the buttons is designated as the secondary designated topic $TPX_2(j)$. In addition, texts put on the respective buttons ($TPX_1(1)$ to $TPX_1(N_1)$) may be voice-input to the microphone constituting the input device 231 to designate the topic. An inverse operation (e.g., swiping from the second window $W_2$ into the first window $W_1$, or a voice input of the corresponding text and of designation cancel) may cancel the designation of the topic as the secondary designated topic of the primary designated topic.

Figure 6B:
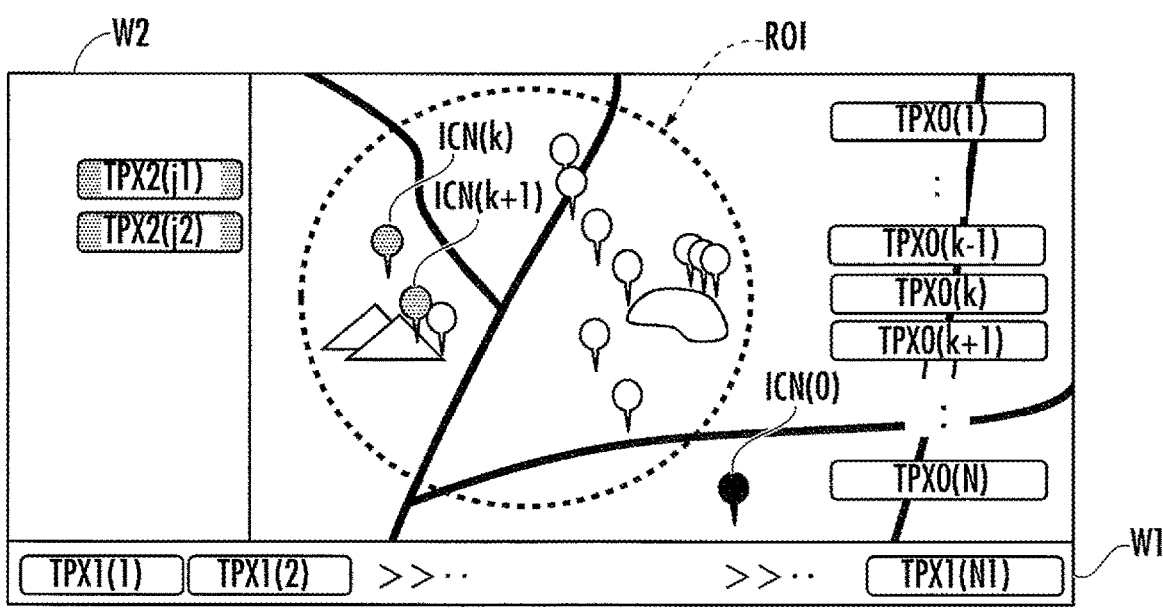
FIG. 6B is an explanatory diagram regarding designation of a designated topics set in the navigation client.

In response to this, for example, as shown in FIG. 6B, the buttons respectively representing the primary designated topics $TPX_1(i)$ and $TPX_1(i+1)$ constituting the set disappear from the first window $W_1$, and are displayed in the second window $W_2$ as the buttons respectively representing the secondary designated topics $TPX_2(j_1)$ and $TPX_2(j_2)$. Designation of the set is repeated such that the button representing the secondary designated topic $TPX_2(j)$ constituting the designated set gradually increases.

Note that the primary designated topics $TPX_1(i)$ are together displayed in a form of a set and designated as the secondary designated topics $TPX_2(j)$ in a form of the set, but in anther embodiment, the primary designated topics $TPX_1(i)$ may be designated separately or one by one as the secondary designated topic $TPX_2(j)$.

Figure 7A:
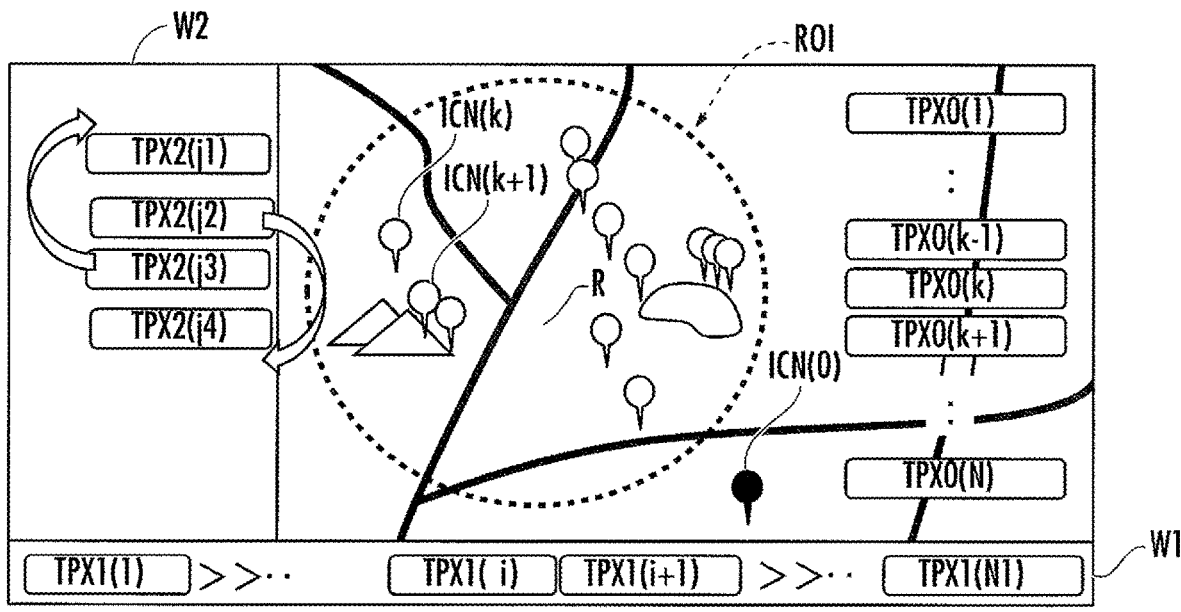
FIG. 7A is an explanatory diagram regarding designation of an order of sets in the navigation client.

In the navi-client 2, an order of the secondary designated topics $TPX_2(j)$ may be arbitrarily changed by the user through the input device 231. For example, as shown in FIG. 7A, in a case where the buttons corresponding to four secondary designated topics $TPX_2(j_1)$ to $TPX_2(j_4)$ are displayed in the second window $W_2$, an upper-lower relationship between the buttons may be changed by swiping such that an order of $TPX_2(j_1) \rightarrow TPX_2(j_2) \rightarrow TPX_2(j_3) \rightarrow TPX_2(j_4)$ is changed into a different order such as of $TPX_2(j_3) \rightarrow TPX_2(j_1) \rightarrow TPX_2(j_4) \rightarrow TPX_2(j_2)$.

Note that an order of a set having elements of the secondary designated topics may be changed to change an order of the secondary designated topics. For example, by changing an order of $[TPX_2(j_1), TPX_2(j_2)] \rightarrow [TPX_2(j_3), TPX_2(j_4)]$ into an order of $[TPX_2(j_3), TPX_2(j_4)] \rightarrow [TPX_2(j_1), TPX_2(j_2)]$, an order of $TPX_2(j_1) \rightarrow TPX_2(j_2) \rightarrow TPX_2(j_3) \rightarrow TPX_2(j_4)$ may be changed into an order of $TPX_2(j_3) \rightarrow TPX_2(j_4) \rightarrow TPX_2(j_1) \rightarrow TPX_2(j_2)$. Such changing of the order may be inhibited.

If the last topic of one set is the same as another topic of another set subsequent to the one set, buttons respectively corresponding to the same topics may be displayed in one form.

The first client arithmetic processing element 21 recognizes a request for the guide information (STEP227 in FIG. 3), and then, the request is transmitted to the navi-server 1 (arrow X23 in FIG. 3). For example, whether or not the request is made may be determined depending on whether or not a predetermined operation through the input device 231 is done. Examples of the "predetermined operation" may include tapping a guide request button on the screen (not shown), and besides, setting operation of one or both of a start position and a start time, for example. The request for the guide information transmitted to the navi-server 1 includes the current position or start position of the navi-client 2, a current time or the start time, the secondary designated topics $TPX_2(j)$, and the order of these topics.

In the navi-server 1, the first server arithmetic processing element 11 recognizes the request for the guide information, and then, the guide information is generated for guiding in the order of the secondary designated topics $TPX_2(j)$ included in the request (STEP122 in FIG. 3) and transmitted to the navi-client 2 (arrow X24 in FIG. 3).

For example, at least one guide route for going through the secondary designated topics $TPX_2(j)$ in order is found or calculated from the current position of the navi-client 2 on the basis of the navi-server map information. A standard staying time period T(j) at a POI(j) corresponding to each secondary designated topic $TPX_2(j)$ depending on the cluster of the navi-client 2 or its user of the staying history is retrieved from the navi-server storage device 10. For each of a plurality of links constituting the guide route, a required time $\Delta T(j)$ for travelling from the POI(j) to a subsequent POI(j+1) is calculated on the basis of the road environment information. Then, the guide information is generated which indicates a repeat such as of travelling from the current position or the start position to the first POI(1), and thereafter, staying at the POI(j) for the time T(j), and then, travelling to the next POI(j+1) taking the time $\Delta T(j)$ and so on.

Figure 7B:
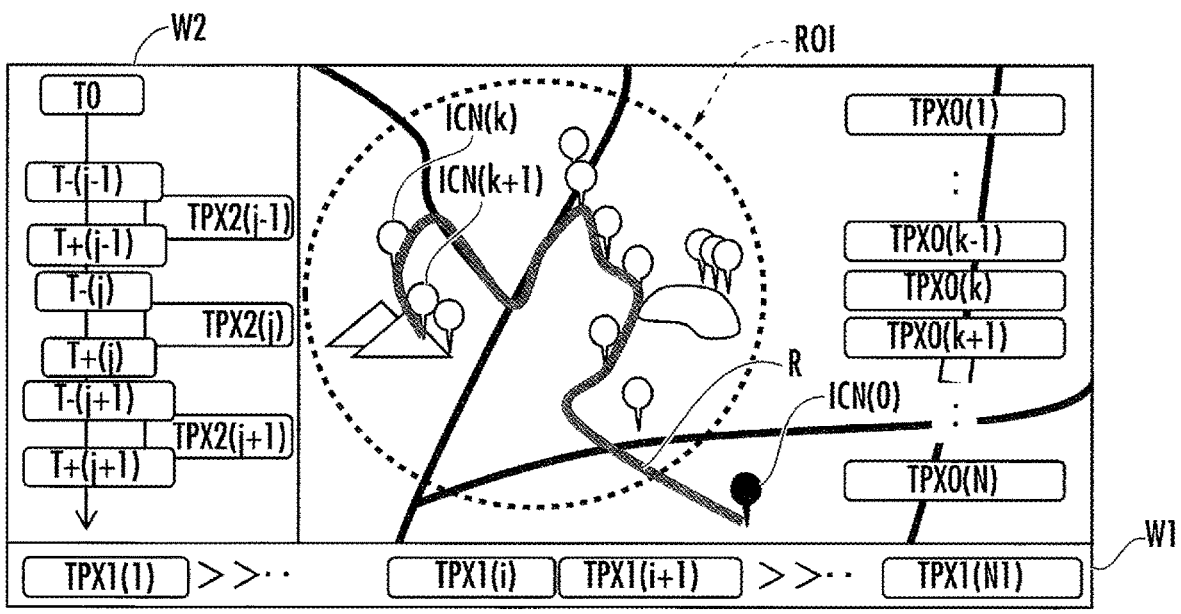
FIG. 7B is an explanatory diagram regarding guide information output in the navigation client.

In the navi-client 2, the second client arithmetic processing element 22 receives the guide information, and then, the information is output on the output device 232 (STEP228 in FIG. 3). This allows the guide information to be displayed on the second window $W_2$, for example, as shown in FIG. 7B, the guide information indicating a repeat such as of travelling from the current position or the start position to the first POI(1), and thereafter, staying at the POI(j) for the time T(j), and then, travelling to the next POI(j+1) taking the time $\Delta T(j)$ and so on.

Note that at a timing when the secondary designated topics $TPX_2(j)$ are designated, the request for the guide information may be transmitted to the navi-server 1 automatically or by way of a predetermined operation through the input device 231 such that the guide information corresponding to this request is output in the navi-client 2 through the output device 232. For example, as shown in FIG. 6B, at a timing when two secondary designated topics $TPX_2(j_1)$ and $TPX_2(j_2)$ are designated, the guide information may be displayed in the second window $W_2$ (see FIG. 7B).

Effect

According to the navi-system having the above function, the user can designate, on the navi-client 2, a plurality of topics from among the topics $TPX_0(k)$ in the designated area ROI, as the primary designated topics $TPX_1(i)$ and further as the secondary designated topics $TPX_2(j)$ (see STEP224 and STEP226 in FIG. 3, FIG. 5A, FIG. 5B, FIG. 6A and FIG. 6B). Then, on the navi-client 2, the guide information can be output for guiding the plurality of POIs(j) corresponding to the secondary designated topics $TPX_2(j)$ in the order which is basically defined in accordance with the correlation rule among the designated topics $TPX_2(j)$ (see STEP122 to STEP228 in FIG. 3 and FIG. 7B).

Since a set of the primary designated topics to which the corresponding buttons are arrayed in accordance with the correlation rule is together designated as the secondary designated topics $TPX_2(j)$, at least when the designation is made at first, the secondary designated topics $TPX_2(j)$ as the elements of the set are arrayed in accordance with the correlation rule in the second window $W_2$ (see FIG. 6B). Therefore, the guide information can be generated in a form that at least a part of a context of the text data as a base of the correlation rule registered in the navi-server storage device 10 is reflected to the correlation rule.

This allows, even if a designated area ROI is less familiar or unfamiliar to the user, the user to select a plurality of topics of interest from among the topics $TPX_0(k)$ in this designated area ROI to guide a plurality of places or POIs corresponding to the plurality of topics in the order in accordance with the correlation rule.

Another Embodiment of the Present Invention

In the above embodiment, the guide information is generated in the navi-server 1, but may be generated in the navi-client 2. In this case, for example, until or when the guide information is requested at the latest (see STEP227 in FIG. 3), the "staying history" and "road environment information" required for generating the guide information are retrieved from the navi-server storage device 10 in the navi-server 1, and then, transmitted from the navi-server 1 to the navi-client 2. Then, in the navi-client 2, the second client arithmetic processing element 22 generates the guide information on the basis of the secondary designated topics $TPX_2(j)$, the order of these, and in addition, the transmitted information.

In the above embodiment, the guide information is generated which indicates travelling in order with staying at the POIs(j) corresponding to the respective secondary designated topics $TPX_2(j)$, but, as another embodiment, the guide information may be generated which indicates travelling in order with staying at the POIs(i) corresponding to the respective primary designated topics $TPX_1(i)$. The order of the primary designated topics $TPX_1(i)$ may be arbitrarily changed by operating the plurality of buttons corresponding to these topics.

What is claimed is:
1. A navigation server comprising:
  a navigation server storage device configured to
    store a set of topics for each of a plurality of areas and a correlation rule defining an order of the topics contained in the set;
  a first server arithmetic processing element configured to
    recognize a designated area in a navigation client based on a communication with the navigation client as a mobile station;
    retrieve a plurality of topics in the designated area and a correlation rule, based on probe information, among the plurality of topics from the navigation server storage device, wherein the probe information represents a time series of a position of the navigation client or factors affecting running of a vehicle detected in the navigation client; and
    generate guide information for guiding the vehicle in an order of the plurality of topics transmitted to the navigation client; and
  a second server arithmetic processing element configured to
    assist, by transmitting the plurality of topics and the correlation rule retrieved by the first server arithmetic processing element to the navigation client, the navigation client in designating a topic group that is at least a part of the plurality of topics and in outputting guide information on an output interface of the navigation client for guiding a plurality of places corresponding to at least a part of the topic group in an order defined in accordance with the correlation rule, wherein buttons of the output interface respectively represent the plurality of topics arrayed in the order defined in accordance with the correlation rule.

2. The navigation server according to claim 1, wherein the second server arithmetic processing element is further configured to assist, by transmitting the plurality of topics and the correlation rule to the navigation client, in designating, after the designating of the topic group in the navigation client, at least a part of a plurality of primary designated topics composing the topic group as a plurality of secondary designated topics and in outputting the guide information for guiding a plurality of places corresponding to the plurality of secondary designated topics in an order defined in accordance with the correlation rule.

3. The navigation server according to claim 2, wherein the second server arithmetic processing element is further configured to assist, by transmitting the plurality of topics and the correlation rule to the navigation client, in outputting the respective primary designated topics in the navigation client in a state of being assigned as elements of each of a plurality of sets and being arrayed in an order in accordance with the correlation rule and in designating at least a part of the plurality of sets as the plurality of secondary designated topics.

4. The navigation server according to claim 1, wherein the first server arithmetic processing element is further configured to obtain text data unique to an arbitrary area based on a communication with at least one of an unspecified number of navigation clients and other information sources and extract a set of topics in the area by analyzing the text data in accordance with a predetermined text data analysis method for storing in the navigation server storage device.

5. The navigation server according to claim 1, wherein the first server arithmetic processing element is further configured to set the correlation rule by subjecting the set of topics to correlation analysis for storing in the navigation server storage device.

6. The navigation server according to claim 1, wherein the first server arithmetic processing element is further configured to:
determine whether or not a user of the navigation client stayed at a place and recognizes a staying history of the user based on a result of the determination, based on the probe information representing the time series of the position of the navigation client transmitted from the navigation client and depending on whether or not a continuous time series of the navigation client for a certain time period or more is contained in a predetermined range using a location of the place as a reference, and
extract, as the correlation rule, a correlation rule for a category of the place the user stops over based on the staying history and stores the correlation rule in the navigation server storage device.

7. The navigation server according to claim 6, wherein the first server arithmetic processing element is further configured to store the correlation rule in the navigation server storage device as a correlation rule for one cluster into which the navigation client is classified, the one cluster being one of a plurality of clusters into which an unspecified number of navigation clients are classified.

8. A navigation system including a navigation server and a navigation client, wherein
the navigation server comprises
a navigation server storage device configured to store a set of topics for each of a plurality of areas and a correlation rule defining an order of the topics contained in the set,
a first server arithmetic processing element configured to
recognize a designated area in a navigation client based on a communication with the navigation client as a mobile station,
retrieve a plurality of topics in the designated area and a correlation rule, based on probe information, among the plurality of topics from the navigation server storage device, wherein the probe information represents a time series of a position of the navigation client or factors affecting running of a vehicle detected in the navigation client, and
generate guide information for guiding the vehicle in an order of the plurality of topics transmitted to the navigation client, and
a second server arithmetic processing element configured to
assist, by transmitting the plurality of topics and the correlation rule retrieved by the first server arithmetic processing element to the navigation client, the navigation client in designating a topic group that is at least a part of the plurality of topics and in outputting guide information for guiding a plurality of places corresponding to at least a part of the topic group in an order defined in accordance with the correlation rule, and
the navigation client comprises an input device, an output device, and a client storage device storing client map information, and further comprises
a first client arithmetic processing element configured to make a navigation server recognize a designated area input through the input device based on a communication with the navigation server, and
a second client arithmetic processing element configured to
receive the plurality of topics in the designated area and the correlation rule among the plurality of topics from the navigation server, and
output the plurality of topics to the output device, wherein buttons of the output interface respectively represent the plurality of topics arrayed in the order defined in accordance with the correlation rule, wherein the first client arithmetic processing element is further configured to
recognize the topic group that is at least a part of the plurality of topics designated through the input device, and
output guide information to the output device, the guide information being for guiding the plurality of places corresponding to at least a part of the topic group in the order defined in accordance with the correlation rule.

* * * * *